(12) United States Patent
Urano et al.

(10) Patent No.: US 12,743,086 B2
(45) Date of Patent: Sep. 22, 2026

(54) REMOTE SUPPORT SYSTEM

(71) Applicant: TOYOTA JIDOSHA KABUSHIKI KAISHA, Toyota (JP)

(72) Inventors: Hiromitsu Urano, Numazu (JP); Takefumi Goto, Gotemba (JP); Hiromitsu Kobayashi, Nagoya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 128 days.

(21) Appl. No.: 18/775,526

(22) Filed: Jul. 17, 2024

(65) Prior Publication Data

US 2025/0028325 A1 Jan. 23, 2025

(30) Foreign Application Priority Data

Jul. 21, 2023 (JP) ................................ 2023-119275

(51) Int. Cl.
*G05D 1/222* (2024.01)

(52) U.S. Cl.
CPC .................................. *G05D 1/222* (2024.01)

(58) Field of Classification Search
None
See application file for complete search history.

(56) References Cited

U.S. PATENT DOCUMENTS

2019/0122640 A1* 4/2019 Kim ....................... G09G 5/377
2021/0183332 A1* 6/2021 Myles .................. H04L 65/612
2023/0323630 A1* 10/2023 Kasai .................... E02F 9/2235
2024/0345588 A1* 10/2024 Niiuchi ..................... B60R 1/22

FOREIGN PATENT DOCUMENTS

JP 2015-047666 A 3/2015
JP 2016-072727 A 5/2016
JP 2021-036414 A 3/2021
WO WO-2014126303 A1 * 8/2014 ............. B25J 13/00

* cited by examiner

*Primary Examiner* — Davin Seol
(74) *Attorney, Agent, or Firm* — Dinsmore & Shohl LLP

(57) ABSTRACT

A remote support system includes a moving body and a remote support terminal operated by a remote supporter. The remote support terminal includes a display device configured to display a support image transmitted from the moving body. The display device displays an auxiliary display being a combination of a first indicator and a second indicator, together with the support image. The first indicator is displayed with a continuous positional change according to an elapsed time from a start of the remote support. The second indicator indicates a communication time needed for communication between the moving body and the remote support terminal by a gap in a position of the second indicator relative to a position of the first indicator, and is displayed with a discontinuous position change accompanying the second indicator being updated at a timing at which the remote support terminal receives the support image.

3 Claims, 6 Drawing Sheets

1
30
Remote Support Terminal
32
Communication Device
36
Control Device
38
Processor
40
Memory Device
42
Control Program
34
Display Device
AD
SI
10
Automated Driving Vehicle
14
Communication Device
18
Control Device
20
Processor
22
Memory Device
24
Control Program
12
Camera
16
GNSS Receiver T0
L
C
AD_1
Te
I1_1
FIG. 2A
C
L
I2_1
AD_1
Te
Td, Ga
I1_1
FIG. 2B
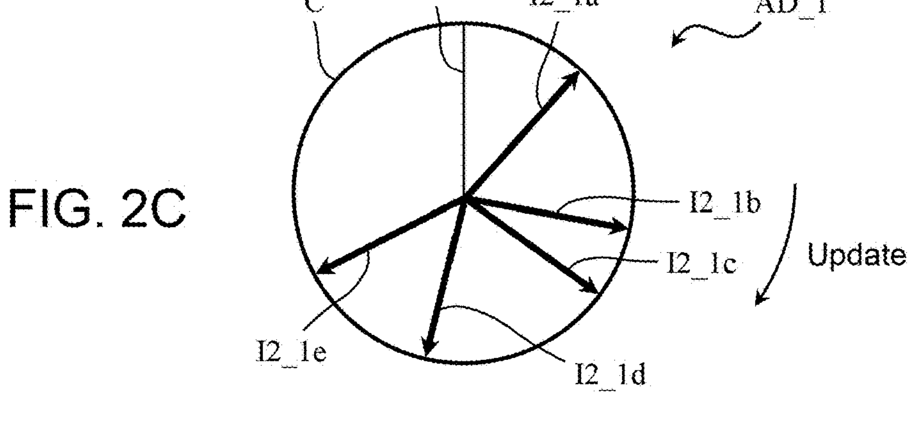
FIG. 2C
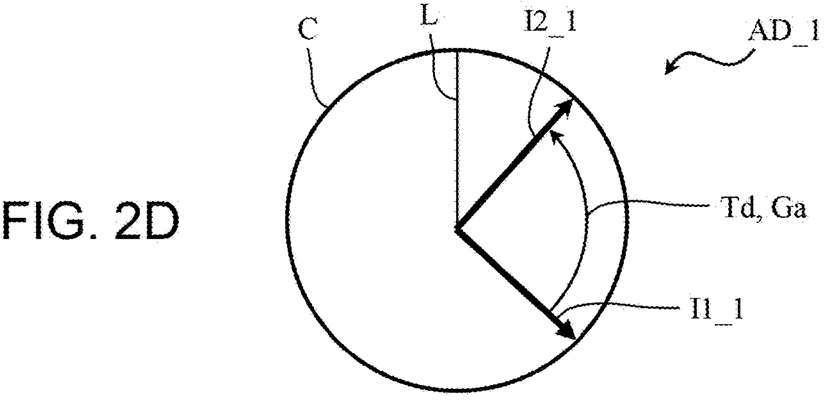
FIG. 2D FIG. 3
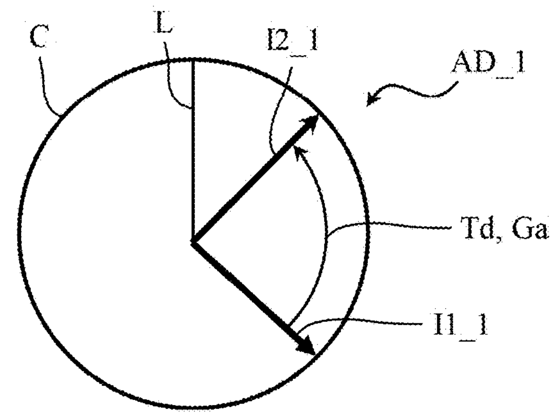
Image Received
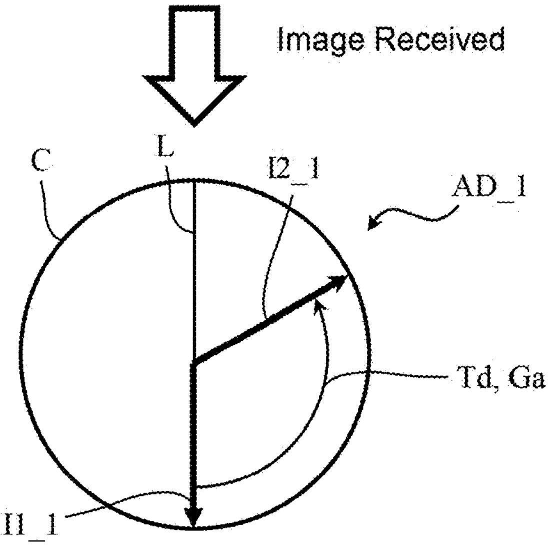
Image Received
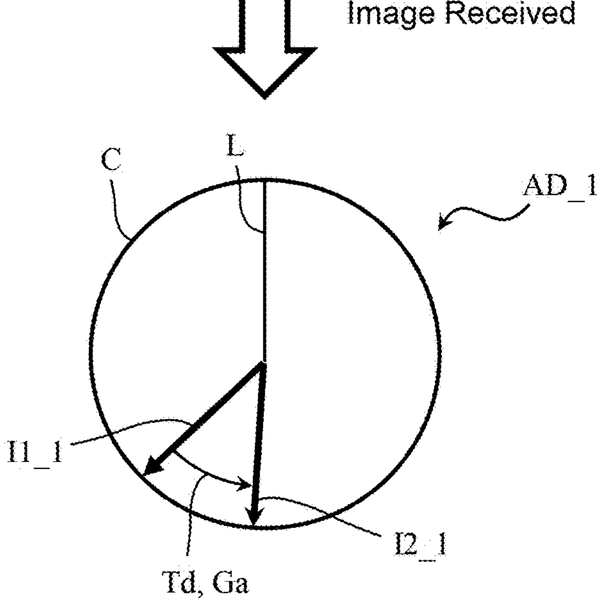

FIG. 5A <Horizontally Long Shape>
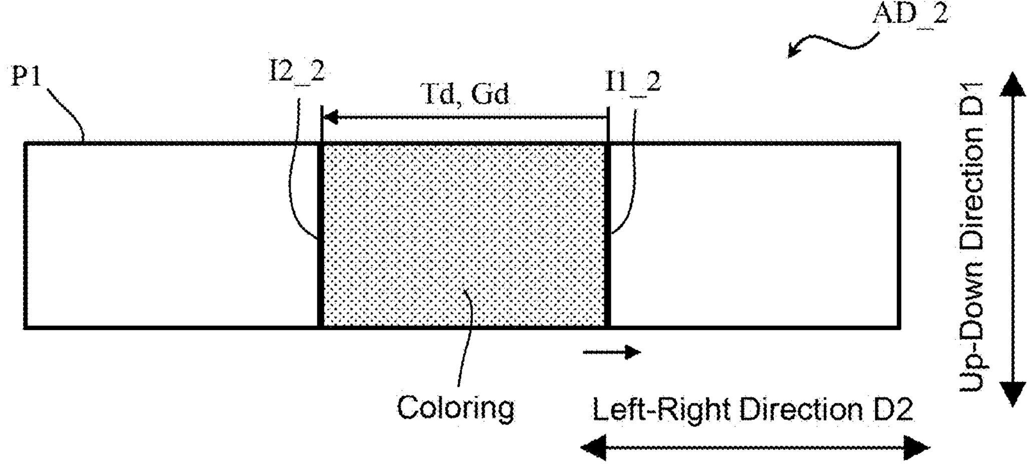
FIG. 5B <Vertically Long Shape>
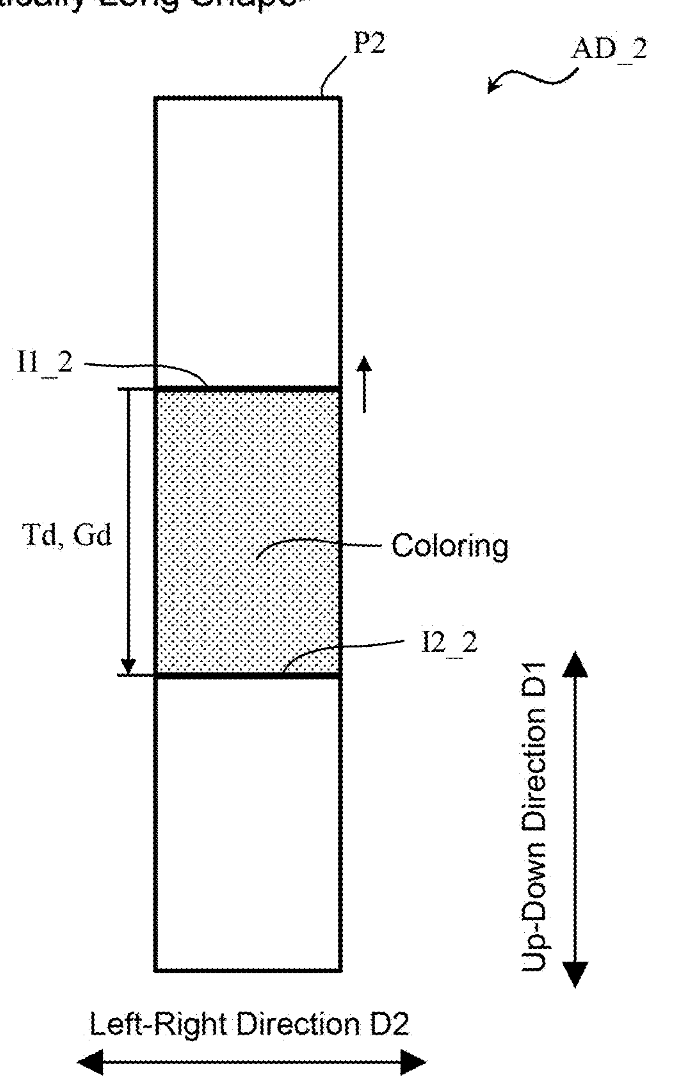

REMOTE SUPPORT SYSTEM

CROSS-REFERENCES TO RELATED APPLICATION

The present disclosure claims priority under 35 U.S.C. § 119 to Japanese Patent Application No. 2023-119275, filed on Jul. 21, 2023, which is incorporated herein by reference in its entirety.

BACKGROUND

Technical Field

The present disclosure relates to a remote support system for a moving body.

Background Art

JP 2021-036414 A discloses a remote operation system for a moving body. A control device of the remote operation system includes a monitor that displays a video from the moving body. The monitor displays the video as well as the delay time of the video.

Moreover, J P 2016-072727 A discloses a video transmission system for remote operation that displays a video delay time by a numerical value or a level. JP 2015-047666 A discloses a remote operation system that displays a communication delay in, for example, a graph.

SUMMARY

In a remote support system for a moving body, it is useful for a remote supporter to display auxiliary information such as a delay time and a frame rate of an image from the moving body (i.e., support image) as an "auxiliary display" on a display device together with the support image. On the other hand, if this kind of auxiliary display is complicated, the workload of the remote supporter may increase. This leads to a need for advanced skills in remote support of the moving body.

The present disclosure has been made in view of the problem described above, and an object of the present disclosure is to provide a remote support system that enables a remote supporter to easily understand auxiliary information from an auxiliary display.

A remote support system according to the present disclosure includes a moving body and a remote support terminal. The remote support terminal is operated by a remote supporter for remote support of the moving body. The remote support terminal includes a display device configured to display a support image transmitted from the moving body for the remote support. The display device displays an auxiliary display being a combination of a first indicator and a second indicator, together with the support image. The first indicator is displayed with a continuous positional change according to an elapsed time from a start of the remote support. The second indicator indicates a communication time needed for communication between the moving body and the remote support terminal by a gap in a position of the second indicator relative to a position of the first indicator, and is displayed with a discontinuous position change accompanying the second indicator being updated at a timing at which the remote support terminal receives the support image.

According to the auxiliary display of the present disclosure, the remote supporter can intuitively and easily understand auxiliary information for remote support from a single display.

BRIEF DESCRIPTION OF THE DRAWINGS

FIG. 2A is a diagram used to describe an auxiliary display AD_1 according to a first example of the embodiment;

FIG. 2B is a diagram used to describe another auxiliary display AD_1 according to the first example of the embodiment;

FIG. 2C is a diagram used to describe still another auxiliary display AD_1 according to the first example of the embodiment;

FIG. 2D is a diagram used to describe yet another auxiliary display AD_1 according to the first example of the embodiment;

FIG. 3 is a diagram showing three auxiliary displays AD_1 representing how the delay time Td changes each time the support image SI is received;

FIG. 5A is a diagram used to describe an auxiliary display AD_2 according to a second example of the embodiment;

FIG. 5B is a diagram used to describe another auxiliary display AD_2 according to the second example of the embodiment;

DETAILED DESCRIPTION

Embodiments of the present disclosure will be described with reference to the accompanying drawings.

1. Configuration of Remote Support System

Figure 1:
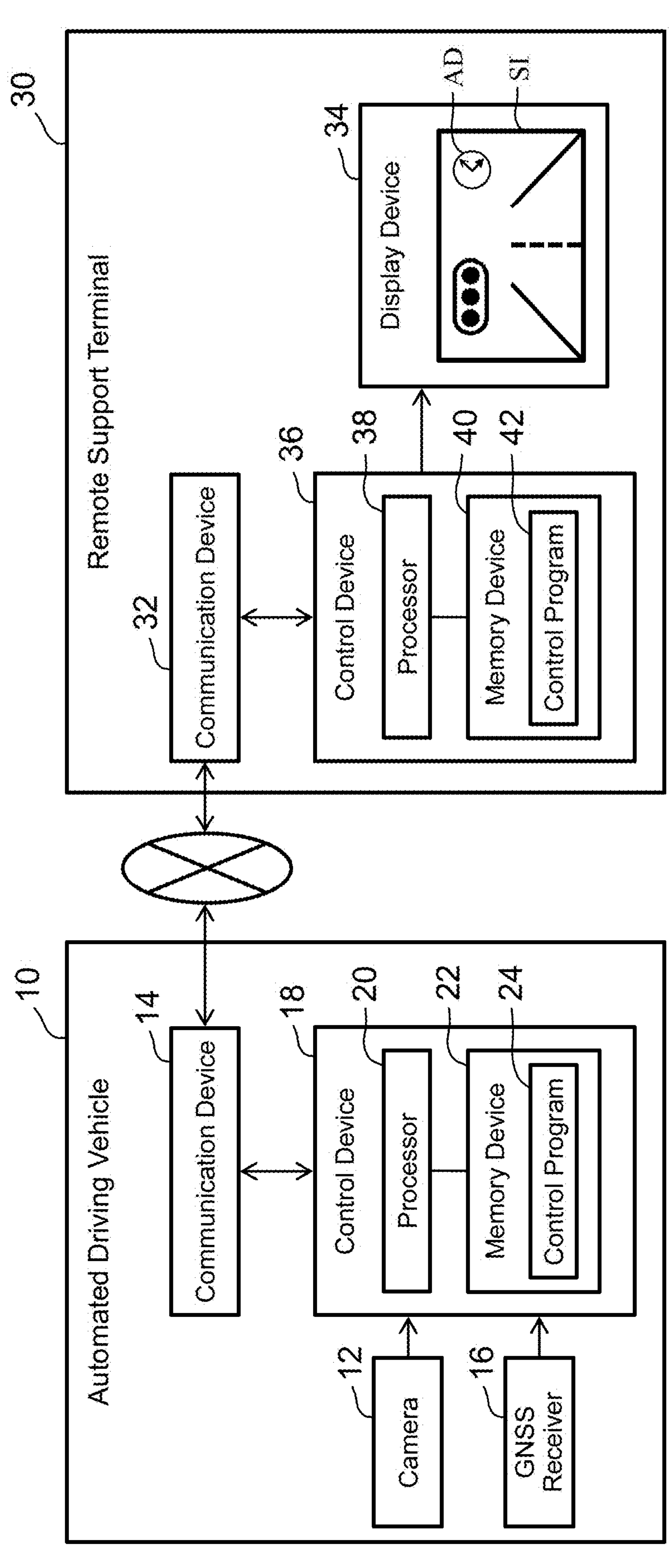
FIG. 1 is a diagram schematically illustrating an example of a configuration of a remote support system according to an embodiment.

FIG. 1 is a diagram schematically illustrating an example of a configuration of a remote support system 1 according to an embodiment. The remote support system 1 is a system for a remote supporter to perform remote support (for example, remote operation, remote monitoring, remote instruction, or remote driving) of a moving body. The remote support system 1 includes an automated driving vehicle (or simply a vehicle) 10 that is a target of remote support, and a remote support terminal 30 operated by the remote supporter.

The vehicle 10 is an example of a "moving body" according to the present disclosure. The moving body may be a vehicle driven by a driver instead of the automated driving vehicle. In another example, the moving body may be a robot such as a logistics robot or a work robot, or may be a flying object such as an airplane or a drone.

The vehicle 10 includes a camera 12, a communication device 14, a global navigation satellite system (GNSS) receiver 16, and a control device 18. The camera 12 captures an image of the surroundings of the vehicle 10 and acquires an image indicating the situation around the vehicle 10. The image is an image seen by the remote supporter who uses the remote support terminal 30, and thus is referred to as a "support image SI" for convenience of description. In the example of the vehicle 10, the support image SI includes, for example, a front image of the vehicle 10. The communication device 14 communicates with the outside of the vehicle 10 via a communication network. Specifically, the communication device 14 communicates with, for example, the remote support terminal 30. The GNSS receiver 16 is used to acquire the position and the orientation of the vehicle 10.

The control device 18 is a computer configured to control the vehicle 10. The control device 18 includes one or more processors 20 (hereinafter, simply referred to as a processor 20) and one or more memory devices 22 (hereinafter, simply referred to as a memory device 22). The processor 20 executes various processes related to the control of the vehicle 10. The memory device 22 stores various kinds of information necessary for processing by the processor 20. A control program 24 is a computer program for controlling the vehicle 10. The functions of the vehicle 10 are realized by the cooperation of the processor 20 that executes the control program 24 and the memory device 22. The control program 24 is stored in the memory device 22. Alternatively, the control program 24 may be recorded in a computer-readable recording medium.

The remote support terminal 30 includes a communication device 32, a display device 34, and a control device 36. The communication device 32 communicates with the vehicle 10 via the communication network. The display device 34 presents various kinds of information to the remote supporter by displaying the various kinds of information. The various information includes an image for the remote support of the vehicle 10, that is, the support image SI described above. In FIG. 1, a front image of the vehicle 10 is shown as an example of the support image SI displayed on the display device 34.

The control device 36 controls the remote support terminal 30. The control device 36 includes one or more processors 38 (hereinafter, simply referred to as a processor 38) and one or more memory devices 40 (hereinafter, simply referred to as a memory device 40). The processor 38 executes various processes related to the remote support including display control of an image displayed on the display device 34. The memory device 40 stores various kinds of information necessary for processing by the processor 38. A control program 42 is a computer program for controlling the remote support terminal 30. The functions of the remote support terminal 30 are realized by the cooperation of the processor 38 that executes the control program 42 and the memory device 40. The control program 42 is stored in the memory device 40. Alternatively, the control program 42 may be recorded in a computer-readable recording medium.

In the remote support system 1, the vehicle 10 (communication device 14) transmits the support image SI to the remote support terminal 30. The remote support terminal 30 (communication device 32) receives the support image SI from the vehicle 10. The remote support terminal 30 presents the received support image SI to the remote supporter. The presentation of the support image SI includes displaying the support image SI on the display device 34. The remote supporter sees the presented support image SI, understands the situation around the vehicle 10, and remotely supports the operation of the vehicle 10. To be more specific, the remote support by the remote supporter is, for example, remote operation, remote monitoring, remote instruction, or remote driving. Information indicating the instruction or the operation amount by the remote supporter is transmitted from the remote support terminal 30 to the vehicle 10. The vehicle 10 operates in accordance with an instruction or an operation by the remote supporter. It should be noted that the transmission of the support image SI from the vehicle 10 (moving body) for the remote support may be performed using, for example, stream video distribution.

2. Auxiliary Display

Communication between a moving body such as the vehicle 10 and a remote support terminal may become unstable due to the influence of noise or traffic. When the communication becomes unstable when a support image SI acquired by the moving body is displayed on a display device, transmission of the support image SI from the moving body may be delayed, or the frame rate (frame/sec) of the support image SI may become unstable. It is difficult for the remote supporter to perceive the delay or a change in the frame rate. In this regard, it is useful for the remote supporter to display auxiliary information such as a delay time Td and the frame rate of the support image SI on the display device together with the support image SI. On the other hand, if the auxiliary display indicating the auxiliary information is complicated, the workload of the remote supporter may increase. Specifically, it may not be easy for the remote supporter to interpret or handle the display of a plurality of pieces of auxiliary information at the same time while performing the remote support.

Accordingly, in the present embodiment, in order to provide the remote supporter with an "auxiliary display AD" that enables the remote supporter to easily understand the auxiliary information, the display device 34 displays the auxiliary display AD together with the support image SI. The auxiliary display AD is a combination of a first indicator and a second indicator.

Additionally, the process for displaying the auxiliary display AD on the display device 34 can be executed as follows. That is, for example, the processor 38 of the remote support terminal 30 generates an auxiliary display AD, and combines the generated auxiliary display AD with the support image SI to display the combined image on the display device 34. Alternatively, the process may be executed, for example, in cooperation with the processor 38 and the processor 20 of the vehicle 10.

2-1. First Example (Timepiece Shape)

FIGS. 2A to 2D are diagrams respectively used to describe auxiliary displays AD_1 according to the first example of the embodiment. The auxiliary display AD_1 includes a first indicator I1_1 and a second indicator I2_1 together with a circumference C of a circle. The first indicator I1_1 and the second indicator I2_1 are second hands that rotate about the center of the circumference C. It should be noted that, although a straight line L, and arrows indicating elapsed time Te and delay time Td (i.e., angular interval Ga) are shown in FIGS. 2A to 2D, these are for explanation and are not included in the auxiliary display AD_1.

The auxiliary display AD_1 represents a timepiece (or clock) in which the first indicator I1_1 makes one rotation in a designated unit time T0 (for example, three seconds). The straight line L indicates the rotational position of the first indicator I1_1 at the start time of the remote support. The first indicator I1_1 is displayed with a continuous position change according to the elapsed time Te from the start of the remote support.

To be more specific, as shown in FIG. 2A, the first indicator I1_1 is a second hand that is continuously displayed within the circumference C while rotating as the elapsed time Te progresses. That is, the position of the first indicator I1_1 continuously changes with the lapse of time.

While the remote support is continued, the first indicator I1_1 continues to rotate. It should be noted that the rotation direction of the first indicator I1_1 is clockwise, but may be counterclockwise. In addition, in FIG. 2A, illustration of the second indicator I2_1 is omitted.

As shown in FIG. 2B, the second indicator I2_1 indicates the delay time Td relatively by a gap G of the second indicator I2_1 relative to the first indicator I1_1. The delay time Td corresponds to a communication time needed for transmission of the support image SI from the vehicle 10 to the remote support terminal 30. To be more specific, the second indicator I2_1 is displayed within the circumference C so as to indicate the delay time Td by the angular interval Ga (i.e., relative angle) with the first indicator I1_1, which corresponds to an example of the gap G. That is, the second indicator I2_1 is a second hand indicating a point of time earlier than that at the first indicator I1_1 by the delay time Td.

Moreover, the second indicator I2_1 is displayed with a discontinuous change in position accompanying the second indicator I2_1 being updated at a timing TM at which the remote support terminal 30 receives the support image SI. To be specific, FIG. 2C illustrates a plurality of second indicators I2_1*a* to I2_1*e* whose positions are updated each time the reception timing TM arrives. In this example, the position of the second indicator I2_1 is updated in ascending order of the alphabet of the subscript added to the second indicator I2_1. As described above, the second indicator I2_1 is displayed with a discontinuous change in position, unlike the first indicator I1_1 that continuously changes with the lapse of time. In addition, in FIG. 2C, illustration of the first indicator I1_1 is omitted.

Additionally, the second indicator I2_1 may be updated to display only the latest one each time the reception timing TM arrives. Alternatively, as shown in FIG. 2C, the second indicator I2_1 may be updated to display not only the latest one (for example, I2_1*e*) but also one or more second indicators I2_1 (for example, I2_1*a* to I2_1*d*) updated in the past. Furthermore, the plurality of second indicators I2_1 may be displayed with different densities such that the newer one is displayed more densely. According to this example, the display of a second indicator I2_1 becomes lighter each time the reception timing TM arrives, and finally disappears.

FIG. 2D shows the second indicator I2_1 displayed at the arrival of a reception timing TM together with the first indicator I1_1 at the same reception timing TM.

Additionally, the delay time Td is specified as follows, for example. That is, the control device 18 of the vehicle 10 measures a point of time A at which the vehicle 10 transmits the support image SI. On the other hand, the control device 36 of the remote support terminal 30 measures a point of time B at which the support image SI transmitted from the vehicle 10 is received by the remote support terminal 30. Then, in an example in which the processor 38 generates the auxiliary display AD, the processor 38 specifies (calculates) the delay time Td from the difference between the time A acquired from the vehicle 10 and the time B. In addition, in the remote support system 1, the computers (i.e., the control devices) that measure the times A and B are different from each other. Therefore, it is desirable that the control device 18 and the control device 36 are synchronized in time. If time synchronization is not performed or cannot be performed, a time difference necessary for the time synchronization may be acquired in advance. Then, the delay time Td may be corrected in accordance with the time difference.

<Effect>

As shown in FIGS. 2B and 2D, the second indicator I2_1 is displayed at a position corresponding to a point of time earlier than that at the first indicator I1_1 by the delay time Td. Therefore, the remote supporter who sees the auxiliary display AD_1 can easily understand the delay time Td from the angular interval Ga between the first indicator I1_1 and the second indicator I2_1. In addition, for example, FIG. 3 is a diagram showing three auxiliary displays AD_1 representing how the delay time Td changes each time the support image SI is received. The remote supporter who sees the three auxiliary displays AD_1 that change in order as illustrated in FIG. 3 can always understand the delay time Td from the change in the angular interval Ga during the execution of the remote support.

Moreover, according to the auxiliary display AD_1, for example, as illustrated in FIG. 2C, the discontinuous drawing of the plurality of second indicators I2_1 whose positions are updated each time the reception timing TM arrives is displayed on the display device 34, and thus the remote supporter can easily understand the frame rate of the support image SI. More specifically, for example, the remote supporter who sees the display of the plurality of second indicators I2_1 illustrated in FIG. 2C can easily understand that the frame rate is unstable from the variation in the angular interval Ga. Furthermore, for example, the remote supporter who sees the plurality of second indicators I2_1 displayed at substantially equal angular intervals Ga can easily understand that the frame rate is stable. In addition, according to the auxiliary display AD_1, the remote supporter can easily distinguish a video (i.e., moving image) that is stuck, from an image in which there is no change or little change (for example, an image in a windless state, an image in which another vehicle is not captured, or an image when the vehicle 10 is stopped).

As described above, according to the auxiliary display AD_1, the remote supporter can intuitively and easily understand the auxiliary information, such as the delay time Td and the frame rate, from the single display by the combination of the first and second indicators I1_1 and I2_2.

Modification Examples

The example in which the unit time T0 of the auxiliary display AD_1 is 3 seconds has been described above. However, the unit time T0 may be freely set according to the maximum value of the communication delay assumed under the use environment of the remote support system 1, and may be, for example, 10 seconds or 1 minute.

Moreover, the unit time T0 is not limited to a fixed value determined in advance, and may be changeable during execution of the remote support. For example, the unit time T0 may be changed in accordance with the position information of the vehicle 10 and the past communication speed record. For example, when the vehicle 10 is traveling in an urban area with good communication conditions, the unit time T0 may be set to be short. On the other hand, when the vehicle 10 is traveling in a suburban area with poor communication conditions, the unit time T0 may be set to be long. Thus, the auxiliary display AD_1 can be appropriately displayed according to the use environment. Alternatively, the unit time T0 may be set in accordance with, for example, the minimum value of the communication speed of the vehicle 10 in a designated period (for example, 10 minutes) in the past.

Figure 4A:
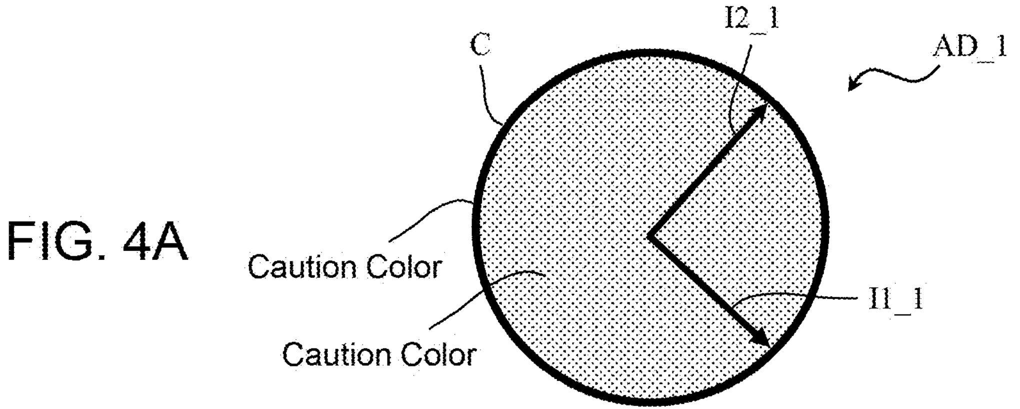
FIG. 4A is a diagram showing a further example of the auxiliary display AD_1 according to the embodiment.
Figure 4B:
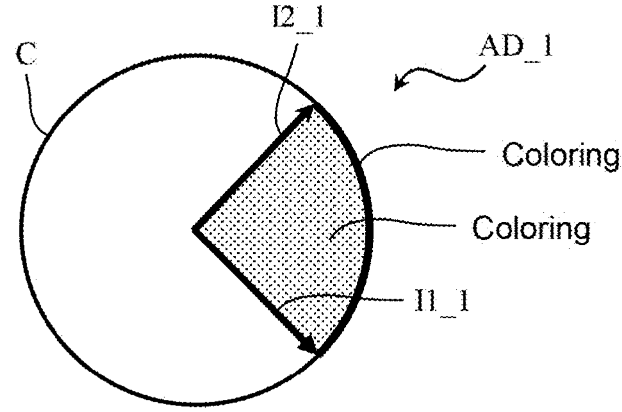
FIG. 4B is a diagram showing a still further example of the auxiliary display AD_1 according to the embodiment.

FIGS. 4A and 4B are diagrams respectively showing other examples of the auxiliary display AD_1 according to the embodiment. When the delay time Td is longer than a designated threshold value, the auxiliary display AD_1 may be colored with a caution (or warning) color to caution (or warn) the remote supporter. Specifically, as shown in FIG. 4A, this coloring may be performed by displaying the circumference C in a caution color (for example, red). Alternatively, as shown in FIG. 4A, the coloring may be performed by displaying the area within the circumference C in a caution color (for example, red). In addition, when the coloring is performed, the circumference C may be displayed to be thicker as illustrated in FIG. 4A, compared to when the delay time Td is equal to or shorter than the threshold value.

Moreover, in order to make it easier to recognize the angular interval Ga in the auxiliary display AD_1, as shown in FIG. 4B, the fan-shaped area representing the angular interval Ga in the auxiliary display AD_1 may be colored with a conspicuous color (for example, red). This coloring may be performed only when the angular interval Ga is equal to or greater than a designated threshold value.

Furthermore, the coloring may not necessarily be performed in a single color. That is, for example, the coloring may be performed such that the color of the entire fan-shaped area is changed from blue to red, for example, in accordance with the size of the angular interval Ga. Alternatively, for example, the coloring may be performed by using gradation display in which the color of the fan-shaped area is gradually changed from blue to red, for example, along the circumferential direction. According to these examples, it is possible to realize the auxiliary display AD_1 that can more easily inform the remote supporter of a change in the angular interval Ga (that is, the delay time Td) from a state in which there is no problem to a state in which a caution (or warning) is needed.

On the other hand, in order to avoid the auxiliary display AD_1 from being troublesome for the remote supporter, the second indicator I2_1 may be hidden when the angular interval Ga is equal to or less than a designated threshold value (that is, when the delay time Td is a value that does not cause a problem). It should be noted that, even when only the first indicator I1_1 is displayed in this way, the remote supporter can recognize whether or not the video is stuck from the presence or absence of the operation of the first indicator I1_1.

2-2. Second Example (Bar Shape)

FIGS. 5A and 5B are diagrams respectively used to describe auxiliary displays AD_2 according to the second example of the embodiment. Instead of the timepiece-shaped auxiliary display AD_1, the "auxiliary display AD" may be a bar-shaped auxiliary display AD_2. The difference of the auxiliary display AD_2 with respect to the auxiliary display AD_1 will be described below.

First, an example shown in FIG. 5A will be described. The auxiliary display AD_2 includes a first indicator I1_2 and a second indicator I2_2 together with an outer periphery P1 of a horizontally long quadrangle (i.e., a horizontally long box). The first indicator I1_2 and the second indicator I2_2 are bars displayed so as to partition the area within the outer periphery P1 in an up-down direction D1.

The first indicator I1_2 is continuously displayed while moving linearly along a left-right direction D2 as the elapsed time Te progresses. With respect to the movement of the first indicator I1_2, the length of the quadrangle having the outer periphery P1 in the left-right direction D2 corresponds to the unit time T0 (for example, 3 seconds). In one example, the first indicator I1_2 moves from left to right on the page of FIG. 5A. After the first indicator I1_2 reaches the right end of the outer periphery P1, the first indicator I1_2 jumps to the left end of the outer periphery P1 and repeatedly moves to the right.

The second indicator I2_2 is displayed so as to indicate the delay time Td by a distance Gd. This distance Gd is a distance between the first indicator I1_2 and the second indicator I2_2 in the left-right direction D2, and corresponds to an example of the "gap G" described above. More specifically, in order to indicate a point of time earlier than that at the first indicator I1_2 by the delay time Td, the second indicator I2_2 is displayed leftward from the first indicator I1_2 by the distance Gd. In addition, similarly to the example of the auxiliary display AD_1, in order to further facilitate the understanding of the gap G, as shown in FIG. 5A, the area representing the distance Gd in the auxiliary display AD_2 may be colored with a conspicuous color (for example, red).

Contrary to the example shown in FIG. 5A, the first indicator I1_2 may be displayed so as to move from right to left. Alternatively, the first indicator I1_2 may be displayed so as to repeat, for example, moving from left to right, then reflecting at the right end to move to the left, and further reflecting at the left end to move to the right.

Moreover, as shown in FIG. 5B, the auxiliary display AD_2 may include the first indicator I1_2 and the second indicator I2_2 together with an outer periphery P2 of a vertically long quadrangle (i.e., a vertically long box). The manner of displaying the first indicator I1_2 and the second indicator I2_2 in this example is basically the same as that in the example shown in FIG. 5A. In addition, the first indicator I1_2 may be displayed so as to move from the bottom to the top on the page of FIG. 5B, or may be displayed so as to move from the top to the bottom.

The auxiliary display AD_2 described above also enables the remote supporter to intuitively and easily understand the auxiliary information, such as the delay time Td and the frame rate, from a single display.

2-3. Third Example (Concentric Circle Shape)

Figure 6:
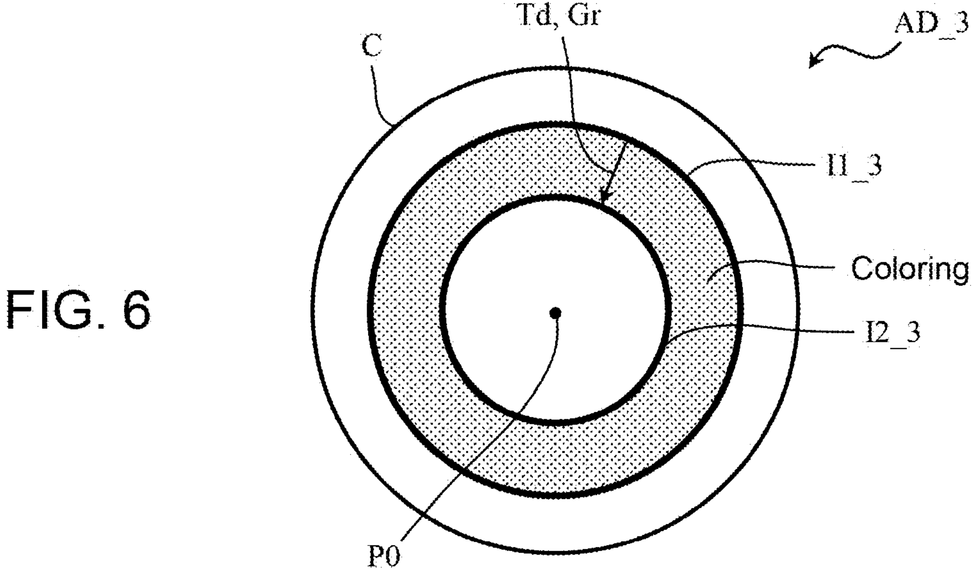
FIG. 6 is a diagram used to describe an auxiliary display AD_3 according to a third example of the embodiment.

FIG. 6 is a diagram used to describe an auxiliary display AD_3 according to the third example of the embodiment. Instead of the timepiece-shaped auxiliary display AD_1, the "auxiliary display AD" may be a concentric-circle-shaped auxiliary display AD_3. The difference of the auxiliary display AD_3 with respect to the auxiliary display AD_1 will be described below.

The auxiliary display AD_3 includes a first indicator I1_3 and a second indicator I2_3 together with the circumference C. The first indicator I1_3 is a circle that is continuously displayed within the circumference C while the size of the circle changes concentrically as the elapsed time Te progresses. In the example of the auxiliary display AD_3, the radius of the circle having the circumference C corresponds to the unit time T0 (for example, 3 seconds). The first indicator I1_3 expands from a center P0 of the circle having the circumference C. After the first indicator I1_3 reaches the position of the circumference C, the first indicator I1_3 may jump to the center P0 and then repeatedly expand. Alternatively, the first indicator I1_3 may be displayed so as to repeat reflecting at the position of the circumference C to move to the center P0, and further reflecting at the position of the center P0 to expand.

The second indicator I2_3 is a circle that is concentric with the first indicator I1_3 and displayed so as to indicate the delay time Td by a radial gap Gr with the first indicator I1_3, which corresponds to an example of the gap G described above. That is, in order to indicate a point of time earlier than that at the first indicator I1_3 by the delay time Td, the second indicator I2_3 is displayed by a circle smaller than the first indicator I1_3 by the radial gap Gr. In addition, similarly to the example of the auxiliary display AD_1, in order to further facilitate the understanding of the radial gap Gr, as shown in FIG. 6, the area representing the radial gap Gr in the auxiliary display AD_3 may be colored with a conspicuous color (for example, red). It should be noted that the arrow indicating the radial gap Gr and the center P0 in FIG. 6 are for explanation and are not included in the auxiliary display AD_3.

The auxiliary display AD_3 described above also enables the remote supporter to intuitively and easily understand the auxiliary information, such as the delay time Td and the frame rate, from a single display.

2-4. Fourth Example (Ring Shape)

Figure 7:
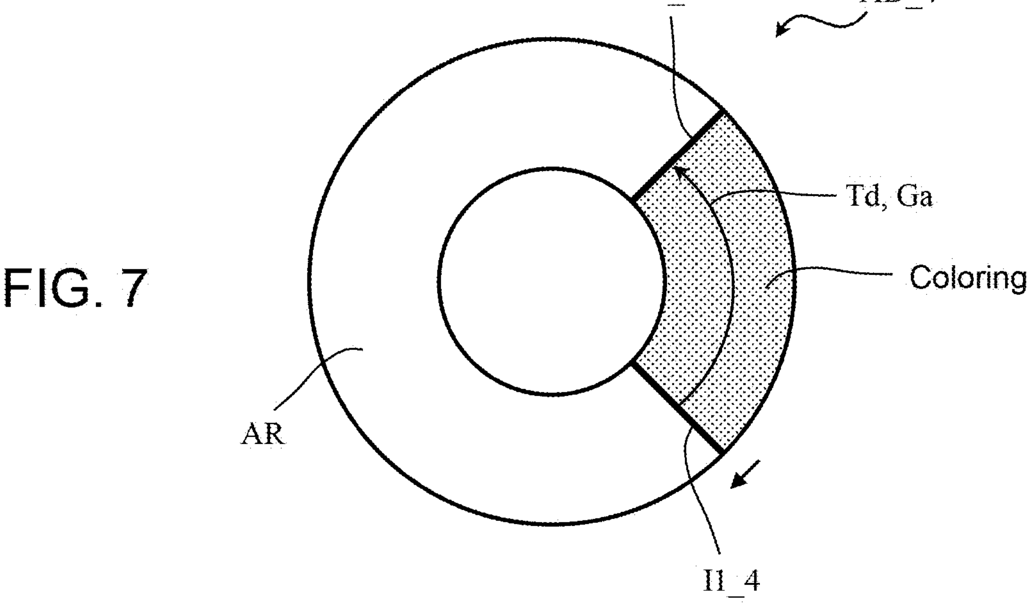
FIG. 7 is a diagram used to describe an auxiliary display AD_4 according to a fourth example of the embodiment.

FIG. 7 is a diagram used to describe an auxiliary display AD_4 according to the fourth example of the embodiment. Instead of the timepiece-shaped auxiliary display AD_1, the "auxiliary display AD" may be a ring-shaped (or annular) auxiliary display AD_4. The difference of the auxiliary display AD_4 with respect to the auxiliary display AD_1 will be described below.

The auxiliary display AD_4 includes a first indicator I1_4 and a second indicator I2_4 together with a ring-shaped (or annular) area AR. The first indicator I1_4 is a bar that is continuously displayed while rotating within the area AR as the elapsed time Te progresses. Similarly to the auxiliary display AD_1, the second indicator I2_4 is a bar displayed within the area AR so as to indicate the delay time Td by the angular interval Ga (i.e., relative angle) with the first indicator I1_4, which corresponds to the example of the gap G. In addition, similarly to the example of the auxiliary display AD_1, in order to further facilitate the understanding of the angular interval Ga, as shown in FIG. 7, the area representing the angular interval Ga in the auxiliary display AD_4 may be colored with a conspicuous color (for example, red). It should be noted that, in FIG. 7, the arrow indicating the angular interval Ga is also for explanation and is not included in the auxiliary display AD_4.

The auxiliary display AD_4 described above also enables the remote supporter to intuitively and easily understand the auxiliary information, such as the delay time Td and the frame rate, from a single display. In addition, in the example of the bar-shaped auxiliary display AD_2 (see FIG. 5A), there is an issue that the first indicator I1_2 may be displayed on the left side of the second indicator I2_2 immediately after the first indicator I1_2 reaches the right end of the outer periphery P1 and jumps to the left end of the outer periphery P1. According to the auxiliary display AD_4, the first and second indicators I1_4 and I2_4 are displayed within the ring-shaped area AR. Therefore, this kind of issue can be solved.

3. Another Example of Communication Time

In the examples of the auxiliary displays AD_1 to AD_4 described above, the delay time Td corresponding to the communication time needed for the transmission of the support image SI from the vehicle 10 (moving body) is used as the "communication time needed for the communication between the moving body and the remote support terminal" according to the present disclosure. However, the "communication time" according to the present disclosure is not limited to the "delay time of image display" described above.

Specifically, the "communication time" according to the present disclosure is not necessarily limited to the "one-way communication time (i.e., delay time)", and may be a "communication time needed for transmission and reception of information in one round-trip between the moving body and the remote support terminal". The one-way delay time is enough to understand how many seconds ago the displayed image has been transmitted from the moving body. On the other hand, in order to understand not only the time until the remote supporter sees the support image SI transmitted from the moving body but also how many seconds it takes for the input from the remote supporter to reach the moving body after the remote supporter views the support image SI, the "communication time for one round-trip" described above may be better.

Moreover, the measurement of the "one-way communication time" or the "communication time for one round-trip" may not necessarily be performed using the communication time needed for the transmission of the support image SI itself. That is, the measurement may be performed by using transmission of a small packet of several kilobytes, for example. In addition, the transmission source in the measurement of the "communication time for one round-trip" is not limited to the moving body, and may be a remote support terminal. That is, the communication time needed for the transmission of information from the remote support terminal to the moving body and the transmission of information from the moving body to the remote support terminal may be measured. Furthermore, the use of the small packet enables the "communication time" to be constantly measured, which is difficult to realize by the use of the support image SI. In addition, being able to constantly measure the "communication time" may facilitate setting an appropriate unit time T0.

What is claimed is:

1. A remote support system, comprising:
a moving body; and
a remote support terminal operated by a remote supporter for remote support of the moving body, wherein
the remote support terminal includes a display device configured to display a support image transmitted from the moving body for the remote support,
the display device displays an auxiliary display being a combination of a first indicator and a second indicator, together with the support image,
the first indicator is displayed with a continuous positional change according to an elapsed time from a start of the remote support, and
the second indicator indicates a communication time needed for communication between the moving body and the remote support terminal by a gap in a position of the second indicator relative to a position of the first indicator, and is displayed with a discontinuous position change accompanying the second indicator being updated at a timing at which the remote support terminal receives the support image,
wherein the first indicator is a second hand continuously displayed while rotating as the elapsed time progresses, and
wherein the second indicator is another second hand displayed so as to indicate the communication time by an angular interval with the first indicator, which corresponds to the gap.

2. A remote support system, comprising:

a moving body; and a remote support terminal operated by a remote supporter for remote support of the moving body, wherein the remote support terminal includes a display device configured to display a support image transmitted from the moving body for the remote support, the display device displays an auxiliary display being a combination of a first indicator and a second indicator, together with the support image, the first indicator is displayed with a continuous positional change according to an elapsed time from a start of the remote support, and the second indicator indicates a communication time needed for communication between the moving body and the remote support terminal by a gap in a position of the second indicator relative to a position of the first indicator, and is displayed with a discontinuous position change accompanying the second indicator being updated at a timing at which the remote support terminal receives the support image, wherein the first indicator is a circle continuously displayed while a size of the circle changes concentrically as the elapsed time progresses, and wherein the second indicator is a circle concentric with the first indicator and displayed so as to indicate the communication time by a radial gap with the first indicator, which corresponds to the gap.

3. A remote support system, comprising:

a moving body; and a remote support terminal operated by a remote supporter for remote support of the moving body, wherein the remote support terminal includes a display device configured to display a support image transmitted from the moving body for the remote support, the display device displays an auxiliary display being a combination of a first indicator and a second indicator, together with the support image, the first indicator is displayed with a continuous positional change according to an elapsed time from a start of the remote support, and the second indicator indicates a communication time needed for communication between the moving body and the remote support terminal by a gap in a position of the second indicator relative to a position of the first indicator, and is displayed with a discontinuous position change accompanying the second indicator being updated at a timing at which the remote support terminal receives the support image, wherein the first indicator is a bar continuously displayed while rotating within a ring-shaped area as the elapsed time progresses, and wherein the second indicator is a bar displayed within the ring-shaped area so as to indicate the communication time by an angular interval with the first indicator, which corresponds to the gap.

* * * * *